July 25, 1939.  D. W. ELLIOTT  2,167,066
LOCATING WATER STRATA IN OIL WELLS
Original Filed March 20, 1935   3 Sheets-Sheet 2
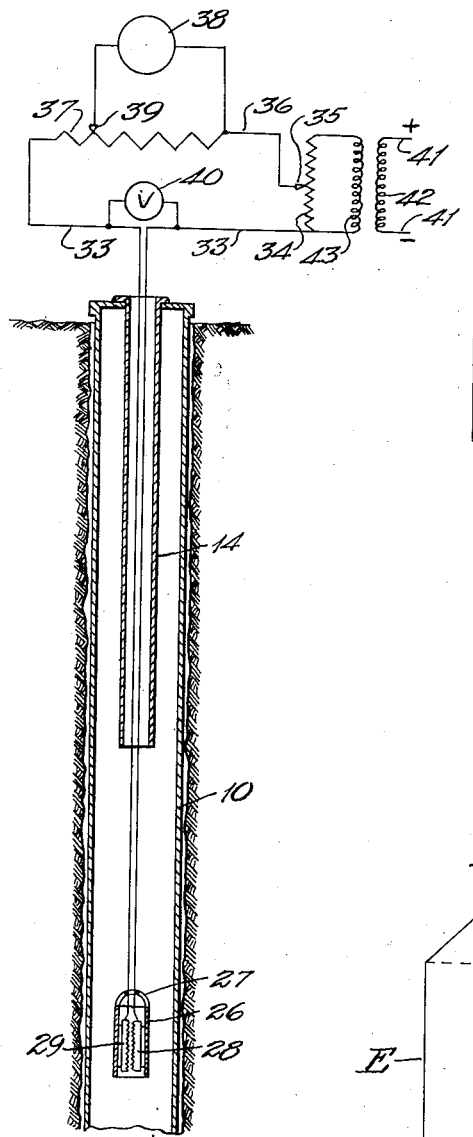
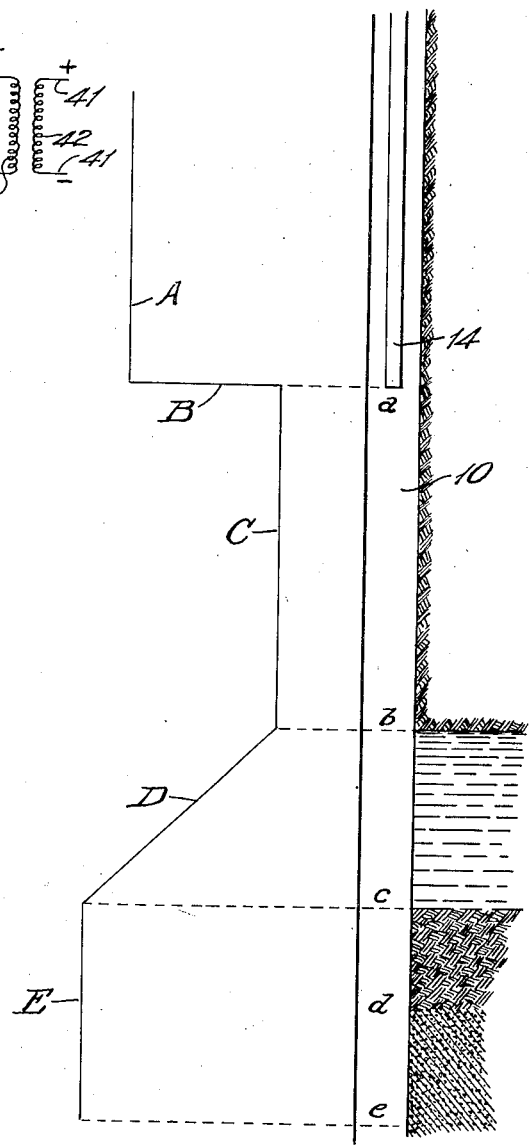
Inventor
D. W. Elliott,
By Foster & Codier
Attorney

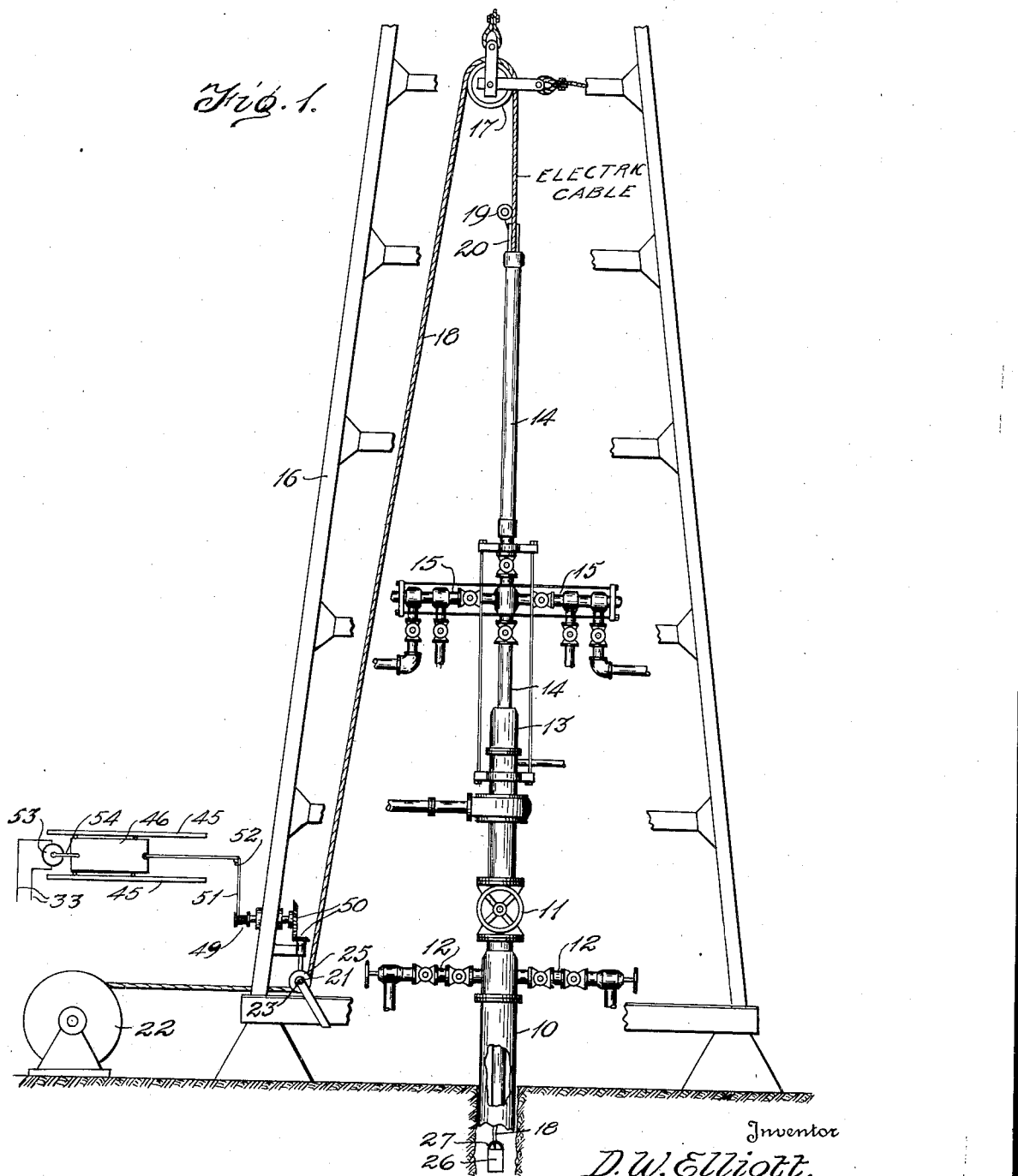

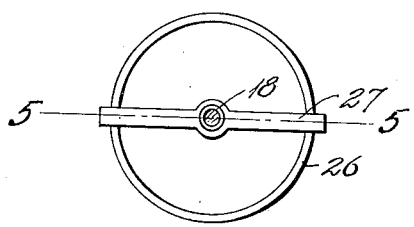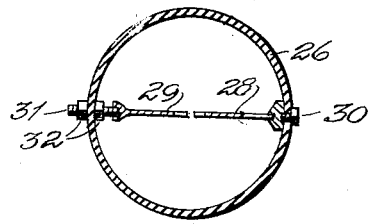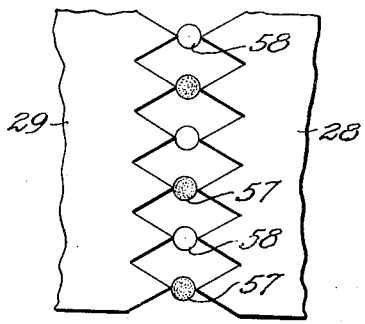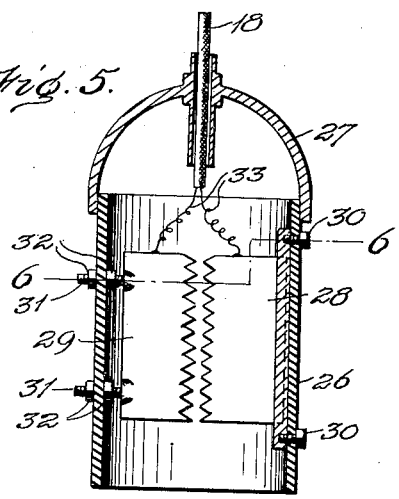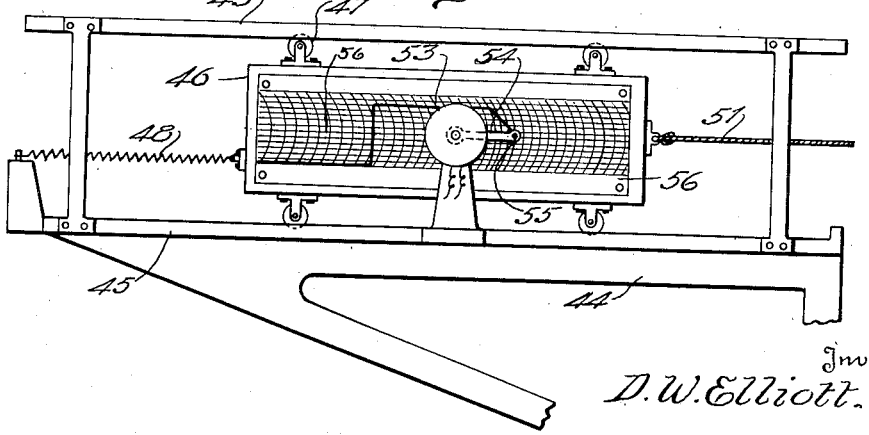

Patented July 25, 1939

2,167,066

UNITED STATES PATENT OFFICE 2,167,066

LOCATING WATER STRATA IN OIL WELLS

Daniel Walter Elliott, Long Beach, Calif., assignor, by mesne assignments, to Lane-Wells Company, Los Angeles, Calif., a corporation of Delaware Application March 20, 1935, Serial No. 12,100
Renewed July 5, 1938

22 Claims. (Cl. 175—183)

This invention relates to a method for determining the point or points of ingress of fluid into a well containing a contrasting fluid, and means to carry said method into execution, and thus may be termed a fluid entry locator for wells, and among the objects of my invention are:

First, to provide a novel method and apparatus of this character which is applicable to determine the point of entry of water into an oil well or the point of entry of gas into an oil well, particularly under conditions wherein some water is present in the oil column, or the entry of oil, or oil and gas, should the well be filled with water, whether such water is produced by the well or introduced for the purpose of the test;

Second, to provide a method and apparatus of this character which is particularly applicable to determine the areas of ingress of water or gas into a flowing oil well without interferring with the operation of a flowing well being tested and thus without loss of production during such tests;

Third, to provide a novel device for carrying the method into execution, by which the areas of water ingress may be determined without the production in the well of artificial environment such as the production of a contrasting fluid column as is common in the electrical conductivity methods now in use for the determination of the sources of water found in oil wells;

Fourth, to provide a device of this character especially adapted for use in connection with naturally flowing wells and those which may be made to flow by artificial means such as an air or gas lift. The reference to flowing oil wells, or to oil wells which are flowing, in the description and in the appended claims, is intended to include oil wells which are able to flow naturally as well as oil wells which may be caused to flow by artificial means;

Fifth, to provide a novel device of this character whereby points or areas of leakage of water into the casing of cased wells may be accurately determined.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is an elevational view, partly diagrammatic and partly in section, and showing the application of this invention to an oil well.

Figure 2 is a diagram showing a form of wiring adapted to be used with this invention.

Figure 3 is a diagrammatic view of an oil well and the graph traced by a recording instrument for indicating the location of water areas in the well.

Figure 4 is a plan view of a housing or casing to support the electric circuit terminals located in the well.

Figure 5 is a section on the line 5—5 of Figure 4.

Figure 6 is a section on the line 6—6 of Figure 5.

Figure 7 is a greatly magnified view of a portion of the circuit terminals showing the relation of oil and water droplets thereto.

Figure 8 is an elevation disclosing a typical form of recording device for use in this invention.

It is to be understood that normally oil wells are provided with a central tubing for the outflow of oil and that said tubing does not fit tightly in the bore of the well but an annular space generally exists between such tubing and surrounding well casing. In such wells the tubing extends well down to a point adjacent the bottom of the well and the annular space above mentioned is tightly packed or closed at the upper end of the bore so that normally no discharge of liquid can be made through such annular space. Moreover, means are generally provided whereby a discharge may be effected from such annular space or fluid may be forced from the upper end of the bore downwardly into this annular space to expel the normal contents thereof when desired.

In the form of the invention herein shown there is provided the usual well casing 10 having at its upper end a casing head provided with a main valve 11 below which are valved branch pipes 12. Above the valve 11 there is cap 13 through which passes a valved pipe 14 having valved branches 15. The cap 13 is suitably packed to prevent leakage around the pipe 14 and this pipe 14 extends downwardly into the casing 10 and upwardly above the branches 15. The uppermost portion of pipe 14 forms the lubricator pipe of the well.

The well is provided with the usual derrick 16 and supported by this derrick is a sheave 17 which is so positioned that its periphery is, at one point, substantially tangent to the center of the casing 10. Over the sheave 17 is trained a two wire cable 18 which passes down the tube 14 and into the casing 10, being guided into the tube by a guide pulley 19 supported by a bracket 20 from the upper end of the tube 14. The cable 18 passes under a pulley or sheave 21 to a winding drum 22 driven by any suitable means (not shown) for winding and unwinding the cable 18. This sheave 21 is fixed on a shaft 23 which serves to actuate a certain part of a recording mechanism indicating, through changes in its position, the depths at which the ends of the cable 18 in the casing 10 are located. One form of such recording mechanism will presently be described.

Referring especially to Figures 4, 5 and 6, there is provided on the lower end of the cable 18 a terminal device which includes an insulating sleeve or barrel 26 provided with a bail 27 by means of which it is attached to the cable 18. Secured at diametrically opposite positions in this barrel is a pair of terminal electrodes 28 and 29. These electrodes are finely serrated on the proximal edges and consist of thin metallic plates resembling sections of hack saw blades. The points of the teeth lie opposite each other to form pairs of terminal points. One of the electrodes, as 28, may be secured in the barrel in fixed position by bolts 30. It is preferred that the other electrode 29 should be movable to adjust the spaces between the pairs of terminal points and such adjustment is here shown as adapted to be accomplished by screws 31 projecting from the rear edge of the electrode through the wall of the barrel, nuts 32 being provided on these screws both within and without said wall. The wires 33 of the cable 18 are connected respectively to the electrodes 28 and 29.

Referring now to Figure 2, it will be seen that one wire 33 has its remaining end connected to a resistance winding 34 having a contact 35 movable over its windings. The contact 35 is connected by a conductor 36 with one end of a resistance 37 which has its other end connected to the remaining wire 33. At 38 there is shown in general a recording instrument such as a recording potentiometer or oscillograph. This instrument has one terminal connected to the conductor 36 while its other terminal is connected to a contact 39 adjustable along the resistance 37. A voltmeter 40 is bridged between the wires 33. Current supply lines 41 are connected to the primary 42 of a transformer having the terminals of its secondary 43 connected to the terminals of the variable resistance winding 34.

In order to enable the operation of the invention to be clearly understood a semi-diagrammatic showing of a recording instrument, indicated generally by the numeral 38 in Figure 2, is illustrated in Figures 1 and 8. Here there is shown a bracket or support 44 carrying a guide frame having parallel rails 45. A record sheet supporting board 46 is provided with wheels 47 to permit its movement along the rails. Suitable means such as a spring 48 urge this board in one direction. A drum 49 (see Fig. 1) is driven by reduction gearing 50 from the shaft 23 and on this drum is wound a cord 51 which passes over an idler pulley 52 to the board 46 so that as the cable 18 is unwound the board will be moved against the resistance of the spring 48. Any suitable reduction gearing which will produce the degree of reduction necessary may be used. The reduction gearing shown at 50 in Figure 1 is intended to indicate more or less symbolically or diagrammatically the presence of reduction gearing at the place shown, and it is to be understood that any suitable and operative reduction gearing may be employed in place of the specific reduction gearing shown in the drawings. Located in front of the board 46 is any suitable electrical instrument 53 having an arm 54 which swings about an axis in accordance with the conditions existing in the circuit including the wires 33. This arm carries a stylus 55 traversing the ruled record sheet 56 secured on the board 46. The curved lines of this sheet are spaced proportionally to the number of feet of cable 18 unreeled from the drum 22 while the horizontal lines are spaced to indicate conductivity factors of the fluids or mixtures being tested; in the present case oil and water. While a recording instrument case has been shown and described as above, it is to be understood that the showing is merely for the purpose of setting forth one operative construction which may be used for the purposes of this invention. However, the invention is not restricted to any particular form of recording instrument, it being merely necessary that the instrument record on a card or chart a graph having one set of coordinates indicating depths in the well and a second set of coordinates indicating changes in an electrical condition existing in the circuit including the electrodes 28 and 29.

In mixtures of oil and water in oil wells the mixture exists as an emulsion, droplets of water being mixed with oil or droplets of oil. An emulsion of water in oil may also be referred to as a dispersion of water in oil or as a dispersion of water droplets in oil. The water associated with oil wells is more or less conductive because of its containing minerals such as sodium chloride. The oil, on the contrary, is substantially non-conductive. Such droplets bridge the spaces between the teeth on the electrode 28 and the teeth on the electrode 29. Consequently the current flowing from one electrode to the other will depend on the quantity of conductive liquid in the emulsion. A condition in which the emulsion is 50% water in an oil water emulsion is shown greatly magnified in Figure 7, the oil droplets 57 alternating with water droplets 56. Obviously the droplets in a 50% mixture will infrequently alternate, but in such a mixture one-half of the pairs of teeth will be bridged by water and the other by oil. Of course, any other proportions will effect such bridging in accordance with the proportions existing in the emulsion.

Figure 3 shows diagrammatically the relationship of the water and oil strata of a well and the graph drawn by the recording instrument when the electrodes pass through regions substantially free of gas. It is to be remembered that the graph is drawn as the terminal electrodes are lowered into the well. To start the operation the tubing 14 is filled as nearly as possible with pure oil, the flow of the well being preferably diverted through the annular space between the casing 10 and the tubing 14 by proper manipulation of the valves. The said introduced oil is for the purpose of establishing a fluid column to balance the tubing pressure and this introduction of oil may be conveniently accomplished by pumping oil into the tubing by means of a pump connected to one of the valved branches 15 shown in Fig. 1. However, the apparatus and method herein described are not limited in application to wells with balanced tubing pressure. The electrode carrier is lowered through the tubing 14. So long as the electrodes are in the inner tube 14 they will be in substantially pure oil or an emulsion of substantially uniform character having but little water in it. Prior to lowering the electrodes in this manner a representative sample of the fluid being produced by the well is obtained and the electrodes immersed therein. Current is then turned on and the electrode spacing is adjusted until a current flow between the electrodes can just be detected. The impressed voltage in the electrode circuit is so regulated by the potential divider 34 that the recording will fall upon the chart or card 56. While passing down the tubing 14 no great fluctuations of potential will be noticed, the recorder showing a substantially straight line A. Upon leaving the tubing 14 the electrodes pass into, under the conditions shown in Figure 3, a zone ab in which a substantially uniform emulsion of oil and water exists. There will then be drawn on the chart a line B indicating a sudden increase of current flow between the electrodes. As the electrodes are lowered they pass down the zone ab in which there is substantially uniform emulsion of oil and water and a graph line C is drawn on the chart. A zone bc is shown as a zone of water entry. As the electrodes pass downwardly through this zone the proportion of water in the emulsion becomes gradually less so that a graph line D is drawn indicating a gradual decrease of conductivity in the emulsion and showing the upper and lower limits of the zone of entry of water into the well. Below the water zone the well is here represented as driven through a non-porous stratum cd, and into an oil bearing stratum de, so that the well from c to e will be filled with oil alone and the graph line will be continued as at E. Thus the depth and extent of the water stratum is accurately determined. Obviously, if there be more than one zone of leakage of water the graph will be modified in such manner as to show the location and extent of the several water zones.

When, however, the electrodes pass through a region wherein the liquid column is agitated by gas there occurs a rapid fluctuation of the resistance between the electrodes in place of the more uniform or gradually changing resistance indicated in the graph. Such characteristic fluctuation, naturally, occurs above the point of entry of the gas so that it is a simple matter to determine such point of entry. Also the point of entry of oil in a mixture of oil and water, or water alone, may be determined by a characteristic increase in resistance. Determination of the point of entry of gas or water, one into the other, is not materially disturbed by the presence of gas, for the fluctuations caused by gas may be superposed without masking the record.

Thus there has been provided a simple and efficient method by which the water source in a flowing oil well may be ascertained by electrical means. It will be noted that a flowing well will generally prevent any dropping of water toward the bottom of the well.

There has thus also been provided a simple and efficient device of the kind described and for the purpose specified.

It is obvious that changes may be made in the form and construction of the invention without departing from the material principles thereof. It is not, therefore, desired to confine the invention to the exact form herein shown and described, but it is desired to include all forms which come within the scope of the appended claims.

I claim:

1. In an electrical device for determining the relative proportions of droplets of substantially immiscible conductive and non-conductive fluids in a column within a well bore: of a pair of electrodes having proximal serrated edges; means for positioning said pair of electrodes at various levels in said column; an electric circuit having its ends connected to said electrodes; and means for measuring variations of current in said circuit.

2. A method of determining the location of ingress of fluid into a flowing oil well, which comprises vertically moving a number of narrowly spaced pairs of points in the flowing material in said well, while maintaining a difference of electrical potential between the points of each pair, and measuring the current passing between the pairs of points, whereby fluctuations in the current flow between said pairs of points will be produced when passing between zones having different fluid contents.

3. A method as covered in claim 2, carried out while maintaining the normal flow of the oil well.

4. An electrical process for determining the point of entrance of water or electrolyte in an oil well which is flowing without interrupting the flow of the well or interrupting its production of oil, which comprises in detecting the relative amount of dispersed water particles at any level by electrode means so closely spaced that the dispersed particles of water or electrolyte will cause electrical contact to be made by said particles across the interelectrode spacing.

5. The method of testing flowing oil wells which comprises balancing the normal pressure in the well, establishing a current gap in the well sufficiently narrow to be bridged by dispersed particles of water in the oil being produced by said well, and measuring the potential difference between the sides of said gap during the flow of current thereacross at different levels in the depth of the well.

6. The method of testing flowing oil wells which consists in establishing a current gap in the well sufficiently narrow to be bridged by dispersed particles of one fluid in the contrasting fluid being produced by said well, and measuring the potential difference between the sides of said gap during flow of current thereacross at different levels in the depth of the well.

7. The process of making a record disclosing the location of water-bearing strata in a flowing well, which process comprises moving vertically in said well a detector responsive to dispersions of droplets of water in oil in the well and capable of varying an electric current in an electrical circuit in which the detector is contained in accordance with conditions of water dispersions in oil in said well and translating said variations in current into correspondingly varying graphical indications correlated with indications of detector positions in the well.

8. The process of ascertaining the location of fluid-bearing strata in a flowing well wherein said fluid has a conductivity in contrast with the other fluids in the well, which process comprises moving vertically in said well a detector responsive to dispersions of droplets of one of said fluids in the other capable of varying an electric current in an electrical circuit in which the detector is contained in accordance with conditions of such dispersion, and translating said variations in current into corresponding visible indications.

9. In a device for measuring the electrical conductivity of a mixture containing oil and water, in which mixture the water is dispersed as small masses in the oil, spaced electrode means provided with pointed portions with the space between the electrode means small enough to cause bridging of the electrode means by the small masses of water.

10. In the art of detecting the position of different phases of matter in a non-homogeneous system comprising oil and water, in which system the water may be present in a portion of the system in the form of dispersed water particles and another portion of the system may be substantially free of dispersed water particles or have such water particles present in less degree, the process which comprises placing closely disposed electrode means at various positions in the system and ascertaining the electrical conductivity between said closely disposed electrode means at said various positions, said electrode means being sufficiently closely disposed that dispersed particles of water which may be present at the said various positions can cause electrical contact to be made across said electrode means to facilitate the passage of electric current which otherwise would be impeded by the relatively non-conducting oil medium, whereby the boundaries between zones as regards content of dispersed water particles can be established.

11. In the art of detecting the points of fluid entry into a well wherein at least two immiscible fluids of different conductivity flow into the well, resulting in one fluid being dispersed in the other, the process which comprises placing closely disposed electrode means at various positions in the well bore along the length thereof and ascertaining the electrical conductivity between said closely disposed electrode means at said various positions, said electrode means being sufficiently closely disposed that globules of the fluid in the internal phase which may be present at the said various positions can come into contact with said electrode means to vary the passage of electric current which otherwise would flow, whereby the boundaries between zones as regards content of one fluid in the other, can be established in the well bore, and the place of ingress of such fluids ascertained.

12. In the art of detecting the place of ingress of water into a flowing oil well containing oil and droplets of water in association with said oil and resulting from the said ingress of water, the process which comprises moving vertically in said flowing well spaced electrode means sufficiently closely disposed in relation to each other that water of said droplets can bridge across the said electrode means and ascertaining variations of the electrical conductivity between said electrode means during the said motion.

13. A method of determining the location of ingress of an electrically contrasting fluid into a flowing oil well provided with tubing and casing surrounding said tubing, which method comprises: balancing tubing pressure by a liquid column; allowing for flow of liquid from the space between said tubing and casing; introducing into said well means enabling an electric current in an electrical circuit with which the means is electrically connected, to be varied in accordance with proportions of such contrasting fluid droplets dispersed in said liquid; and placing said means at various levels in said well and ascertaining the relation of the currents in said circuit at various levels.

14. A method of determining the location of ingress of water into a flowing oil well provided with tubing and casing surrounding said tubing, which method comprises balancing tubing pressure by a liquid column, allowing for flow of oil from the space between said tubing and casing, introducing into said well through said tubing spaced and closely disposed electrode means, placing said closely disposed electrode means at various levels in the well, and ascertaining the relation of the electrical conductivities between said closely disposed electrode means at various levels, said electrode means being sufficiently closely disposed that globules of water which may be present at various levels in the well can bridge said spaced electrode means, whereby the location of zones, in said well, as regards content of water globules can be determined and the place of ingress of water into said well ascertained.

15. In the art of determining the location of ingress of a fluid into an oil well containing a liquid and globules of said fluid in association with the liquid and resulting from the ingress of fluid, the method which comprises: placing, without the production in the well of artificial environments, spaced and closely disposed electrode means at various levels in the well; and ascertaining the relation of the electrical conductivities between said closely disposed electrode means at various levels, said electrode means being sufficiently closely disposed that globules of said fluid which may be present at various levels in the well can bridge said spaced electrode means, whereby the location of zones, in said well, as regards content of such fluid globules can be determined and the place of ingress of such fluid into said well ascertained.

16. In the art of determining the location of ingress of water into an oil well containing droplets of water dispersed in oil and resulting from the said ingress of water, the method which comprises: placing spaced and closely disposed electrode means at various levels in the well; and ascertaining the relation of the electrical conductivities between said closely disposed electrode means at various levels, said electrode means being sufficiently closely disposed that droplets of water which may be present at various levels in the well can bridge said electrode means, whereby the location of zones, in said well, as regards contents of water droplets can be determined and the place of ingress of water into said well ascertained.

17. The method of locating the place of ingress of fluid in an oil well flowing oil and water, which comprises placing spaced and closely disposed electrode means at various levels in the well and ascertaining the relation of the electrical conductivities between said closely disposed electrode means and the anomalies of such conductivity caused by said fluid at various levels, said electrode means being sufficiently closely disposed that globules of water which may be present at various levels in the well can bridge said electrode means.

18. Means for making conductivity measurements in a mixture containing globules of one fluid dispersed in another, comprising spaced electrode means having the space between them small enough to allow bridging of the electrode means by dispersed globules of the fluid in the internal phase, said electrode means being free for movement as a unit in said mixture, and means for positioning said spaced electrode means as a unit at different places in said mixture.

19. Means for determining the location of ingress of water in an oil well containing globules of water dispersed in oil in said well and resulting from the ingress of said water, which means comprises: the combination of spaced and closely disposed electrode means, said electrode means being sufficiently closely disposed that dispersed globules of water which may be present at various levels in the well can bridge said electrode means to facilitate the passage of electric current between said electrode means, said electrode means being movable as a unit to various levels in said oil well; means for placing said electrode means at various levels in said oil well; and means for measuring variations in electrical resistance between said electrode means.

20. Means for determining the location of ingress of electrically contrasting components of a fluid mixture into an oil well, said mixture containing globules of one fluid dispersed in the other, which means comprises: the combination of spaced and closely disposed electrode means, said electrode means being sufficiently closely disposed that dispersed globules of the fluid in the internal phase can bridge said electrode means, said electrode means being movable as a unit to various levels in said well; means for placing said spaced electrode means at various levels in said well; and means for measuring variations in electrical conductivity between said electrode means.

21. Apparatus for determining the location of ingress of electrically contrasting components of a fluid into an oil well, said mixture containing globules of one fluid dispersed in the other, said apparatus comprising: spaced and closely disposed electrode means, said electrode means being sufficiently closely disposed that dispersed globules of the fluid in the internal phase can bridge said electrode means to influence the passage of electric current otherwise flowing between said electrode means; means for holding said electrode means in said position and permitting free access of fluid in the well to said electrode means when the said electrode means and holding means are placed at various levels in the well, said electrode means and holding means being of such dimensions as to permit them to be lowered and raised in said well; two long electrical conductors of sufficient length to reach desired depths in said well, one of said conductors being connected at one end to one of said electrode means and the other of said conductors being connected at one end to another of said electrode means; and electrical conductivity measuring means connected with the other ends of said electrical conductors.

22. Apparatus for determining the location of ingress of water in an oil well which comprises: spaced electrode means closely enough disposed, at least at portions thereof, that dispersed small masses of water appearing in the oil can make electrical connection between the said electrode means, said electrode means being placeable at various levels in the well; means for supplying a difference of electrical potential to said electrode means; means for measuring changes in difference of electrical potential of said electrode means; and means for positioning said electrode means at various levels in the well.

DANIEL W. ELLIOTT.